United States Patent [19]

Harris

[11] Patent Number: 4,533,555
[45] Date of Patent: Aug. 6, 1985

[54] APPARATUS FOR THERMOFORMING DOME-SHAPED ACTUATING ELEMENTS FOR MEMBRANE SWITCHES

[75] Inventor: George E. Harris, Indianapolis, Ind.

[73] Assignee: RCA Corporation, Princeton, N.J.

[21] Appl. No.: 608,591

[22] Filed: May 9, 1984

[51] Int. Cl.³ .............................................. B29C 17/00
[52] U.S. Cl. .................................... 425/384; 425/397; 425/398; 425/400; 425/DIG. 48
[58] Field of Search ............... 425/383, 384, 394, 397, 425/398, 399, 400, DIG. 48, 388; 264/322, 266

[56] References Cited

U.S. PATENT DOCUMENTS

| | | | |
|---|---|---|---|
| 2,358,341 | 9/1944 | Malon | 425/394 |
| 2,516,373 | 7/1950 | Ehlert et al. | 425/394 |
| 2,694,227 | 1/1954 | Fordyce et al. | 425/DIG. 48 |
| 2,874,751 | 2/1959 | Norton | 425/394 X |
| 3,122,598 | 2/1964 | Berger | 264/266 X |
| 3,256,375 | 6/1966 | Bolelli et al. | 425/398 X |
| 3,265,265 | 8/1966 | Lervi | 425/DIG. 48 |
| 3,340,714 | 9/1967 | Pohl et al. | 425/384 X |
| 3,860,771 | 1/1975 | Lynn et al. | 200/76 |
| 4,009,981 | 3/1977 | Rosen | 425/384 X |
| 4,066,851 | 1/1978 | White et al. | 200/86 |
| 4,083,670 | 4/1978 | Reifers et al. | 425/398 |
| 4,105,736 | 8/1978 | Padovani | 425/398 X |
| 4,170,621 | 10/1979 | Kiefer | 425/398 X |
| 4,179,252 | 12/1979 | Seufert | 425/384 X |
| 4,394,342 | 7/1983 | Mercer | 425/DIG. 48 |

Primary Examiner—J. Howard Flint, Jr.
Attorney, Agent, or Firm—Eugene M. Whitacre; Eric P. Herrmann; Dilip A. Kulkarni

[57] ABSTRACT

An apparatus is provided for thermoforming a plurality of protrusions in a plastic sheet. The thermoforming apparatus comprises a pneumatic press having a pair of male and female die plates with respective projections and cavities. One of the die plates is heated. The other die plate is cooled. The cooled die plate is provided with vacuum to ensure that the thermoformed plastic sheet is held against the cooled die plate upon the opening of the press to, in turn, ensure the cooling of the plastic sheet prior to its removal.

15 Claims, 6 Drawing Figures

APPARATUS FOR THERMOFORMING DOME-SHAPED ACTUATING ELEMENTS FOR MEMBRANE SWITCHES

This invention generally relates to membrane keyboard devices, and more particularly, to an apparatus for thermoforming dome-shaped actuators on thin plastic sheets for use in membrane switches.

Membrane keyboard devices are extensively used in electronic products—such as video cassette recorders, video disc players, personal calculators, etc. As the prices of these products fall due to the intense competition, the manufacturers are increasingly under pressure to come up with ways to reduce their manufacturing and parts costs. The membrane switch technology represents one such cost reduction drive.

Typically, a membrane switch includes a preformed plastic sheet having a plurality of depressible, dome-shaped actuating elements. The depression of a dome-shaped element shorts out a pair of conductors to complete an appropriate one of the circuits coupled to the membrane switch. The dome-shaped element provides the user with a snap-action, tactile feedback indicative of the contact closure. Upon release, the dome-shaped element automatically bounces back to its original shape.

To ensure that the dome-shaped elements snap back consistently when released, it is desirable that the shape and geometry of these elements (e.g., the height-to-width ratio of the domes) are accurately and reliably formed. The improved thermoforming apparatus, in accordance with this invention, includes a pair of male and female die plates having a plurality of matching, dome-shaped projections and cavities. One of the die plates is heated. The other die plate is cooled. A polyester sheet is clamped under pressure between the two die plates to thermoform the dome-shaped projections therein. The cooled die plate is provided with vacuum for ensuring that a thermoformed plastic sheet adheres to the cooled die plate upon separation thereof from the heated die plate. The cooled die plate is further equipped with pressurized air to cause the thermoformed plastic sheet to release from the cooled die plate.

Figure 1:
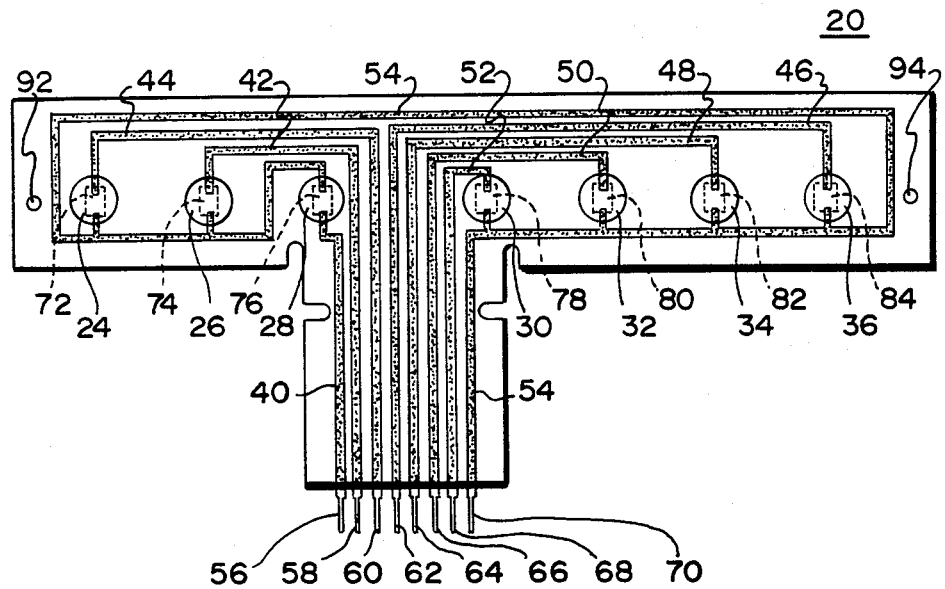
FIG. 1 shows a top view of a membrane switch having dome-shaped switch-actuating elements.
Figure 2:
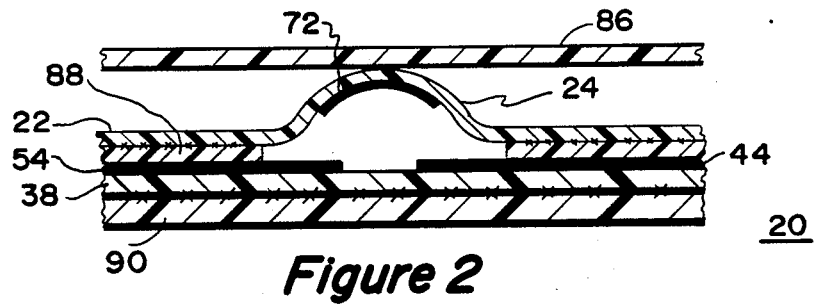
FIG. 2 illustrates a cross-sectional view of the membrane switch.

FIGS. 1 and 2 show a membrane switch 20. The membrane switch 20 includes a top plastic sheet 22 having a plurality of resilient, dome-shaped, actuating elements 24–36 and a bottom plastic sheet 38 having a multiple of conductive tracks 40–54. The conductive tracks 40–54 are connected to the respective connecting pins 56–70. The connecting pins 56–70 are subject to reception in a connector member (not shown) for coupling the switch elements 24–36 to respective circuits (not shown). The inside surfaces of the dome-shaped actuating elements 24–36 are provided with conductive shorting bars 72–84. The switch assembly 20 is further provided with a cover sheet 86 to add electrostatic insulation, an intermediate spacer sheet 88 to provide a better snap action and a protective liner 90 to cover the adhesive (indicated by the crosses in FIG. 2) on the underside of the bottom sheet 38. The protective liner 90 is peeled off prior to installation of the switch 20 to the instrument (not shown). The membrane switch 20 is fitted with a pair of locating holes 92 and 94 for the purpose of accurately positioning the various pieces of the membrane switch during the manufacturing process.

The depression of the flexible dome-shaped switch element (e.g., 24) causes the associated bar (i.e., 72) to short out a corresponding pair of conductive paths (i.e., 44 and 54) to complete an appropriate one of the circuits coupled to the membrane switch 20. The dome-shaped elements 24–36 provide the user with a tactile feedback indicative of the switch closure. Upon release, the dome-shaped elements automatically spring back to their original position.

The top, bottom and intermediate plastic sheets 22, 38 and 88 are typically made from resilient and flexible thermoset polyester materials—such as Mylar manufactured by Dupont. The cover sheet 86 is made from polypropylene. The protective liner 90 is made from paper materials (e.g., coated Kraft paper). The conductive tracks 40–50 and bars 72–84 on the top and bottom plastic sheets 22 and 38 are printed in place using conductive inks and conventional silk-screening processes. The dome-shaped elements 24–36 in the top plastic sheet 22 are thermoformed using a set of die plates in accordance with this invention as explained later. Acrylic-based adhesives are used for securing the various pieces together. The conductive inks and adhesives are infrared cured to provide stability.

The top, bottom and intermediate plastic sheets 22, 38 and 88 are about 0.005 inches thick. The cover sheet 86 is approximately 0.0025 inches thick. The protective liner 90 is about 0.005 inches thick. The height and the width of the dome-shaped elements 24–36 are 0.020 and 0.185 inches respectively.

Figures 3, 4:
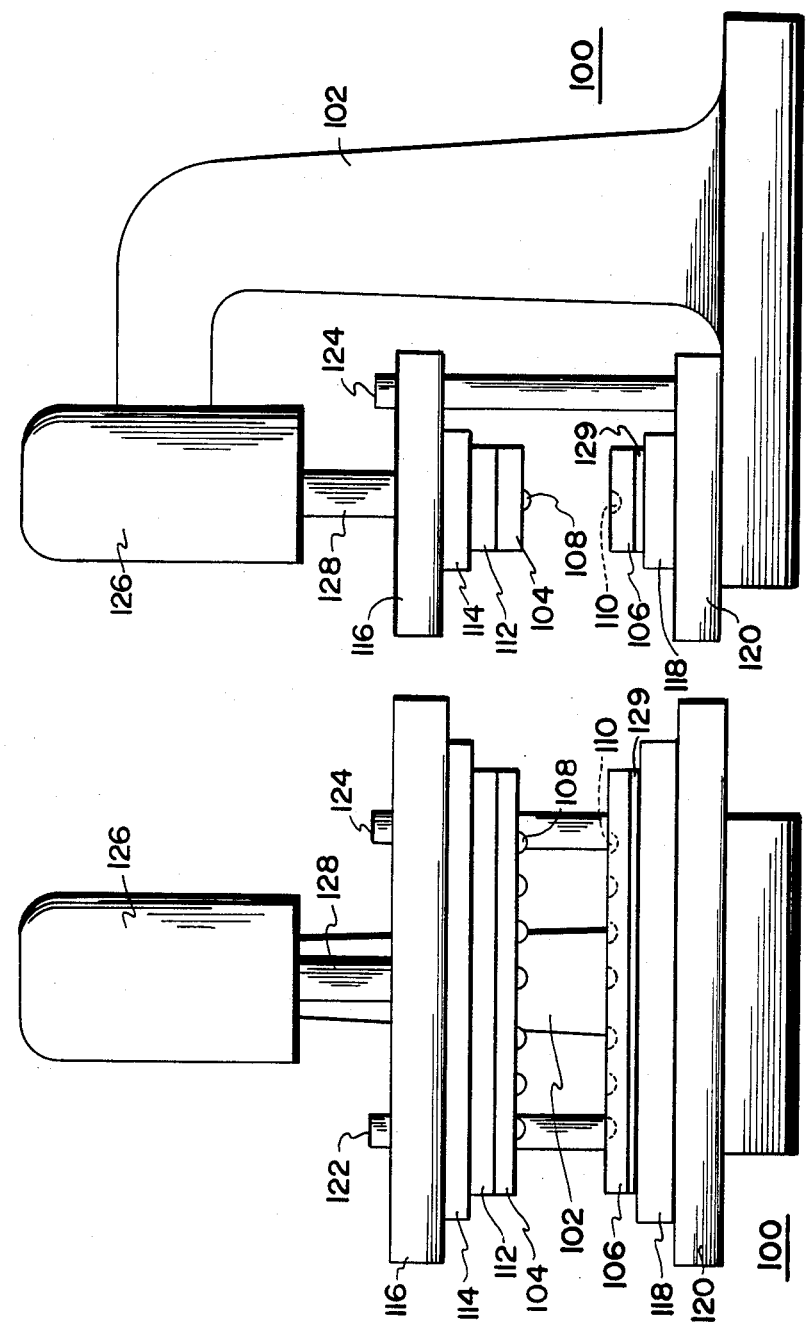
FIGS. 3 and 4 depict a front view and a side view of an apparatus for thermoforming the dome-shaped switch elements in accordance with the subject invention.
Figure 5:
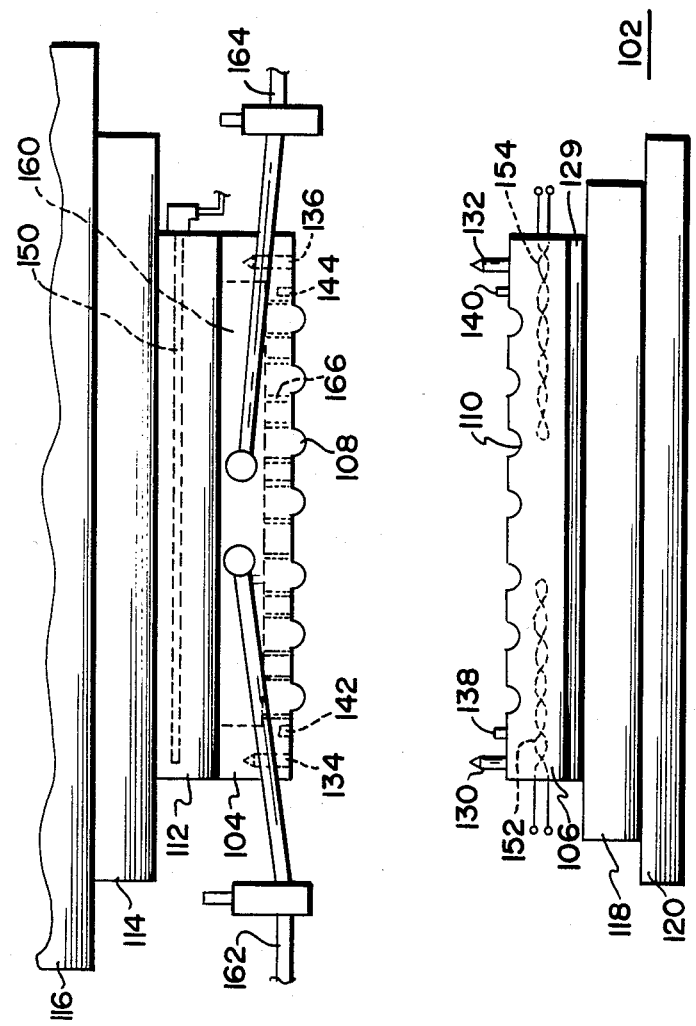
FIG. 5 represents an enlarged view of the essential elements of the subject thermoforming apparatus.

The improved apparatus 100 for thermoforming the dome-shaped elements in a flexible and resilient plastic sheet (e.g., polyester), in accordance with the present invention, will now be described in conjunction with FIGS. 3–5. The thermoforming apparatus 100 comprises a pneumatic press 102 having a pair of male and female aluminum die plates 104 and 106. The pneumatic press 102 is made by the Framco Company and has one ton capacity. The male and female die plates 104 and 106 are respectively provided with a plurality of matching projections 108 and cavities 110. The projections 108 and the cavities 110 in the respective die plates 104 and 106 are accurately formed to ensure precise shaping and dimensioning of the dome-shaped actuating elements 24–36 in the plastic sheet 22.

The male die plate 104 is attached to a spacer plate 112, which is mounted on an upper die block 114, in turn, secured to a movable die shoe 116. The female die plate 106, on the other hand, is secured to a lower die block 118, which is, in turn, mounted on a stationary die shoe 120. The upper die shoe 116 is reciprocably mounted on a pair of vertical guide pins 122 and 124. An air cylinder 126 drives the upper shoe 116 via a connecting rod 128. The die plates 104 and 106, the spacer plate 112 and the die blocks 114 and 118 are all made from aluminum stock. The die shoes 116 and 120 are made from steel. A layer 129 of thermally insulating material—such as cloth based phenolic—is inserted between the die plate 106 and the die block 118 to limit the transfer of heat to the die block 118.

The lower die plate 106 is fitted with a pair of leader pins 130 and 132 which are received in the respective guide holes 134 and 136 in the upper die plate 104 upon closure of the press 102 for the purpose of ensuring accurate registration between the associated projections 108 and the cavities 110 in the die plates. The lower die plate 106 is further provided with a pair of pilot pins 138 and 140 which are received in the respective holes 92 and 94 in the plastic sheet 22 during the thermoforming process to assure accurate positioning thereof with respect to the die plates. The upper die plate 104 is equipped with a pair of holes 142 and 144 for accepting the respective pilot pins 138 and 140 in the lower die plate 106 upon closure of the die plates.

The spacer plate 112 is equipped with a cooling channel 150 through which chilled water at about 55° F. is circulated to keep the upper die plate at a desired temperature (e.g., approximately 65° F.). The lower die plate 106 is provided with a pair of cartridge heaters 152 and 154 to maintain the lower die plate at a preset temperature (e.g., about 212° F.). The cartridge heaters 152 and 154 are made by the DME Company and are each 110 watt capacity.

The upper die plate 112 is equipped with a chamber 160 which is alternately connected to a source of vacuum 162 and pressurized air 164. The vacuum and air chamber 160 is, in turn, connected to the exterior surface of the die plate 104 by means of channels 166. The application of vacuum and air pressure to the upper die plate 104 respectively serves to hold the plastic sheet 22 against the upper die plate for cooling and to eject it therefrom after cooling.

The operation of the thermoforming apparatus 100 is as follows:

The top plastic sheet 22 is placed on the heated lower die plate 106 (at about 212° F.). The pilot pins 138 and 140 of the lower die plate 106 are received in the respective locating holes 92 and 94 in the plastic sheet 22 to accurately locate it on the press 102.

The air cylinder 126 is actuated to drive the upper die plate 104 against the lower die plate 106 to clamp the plastic sheet 22 between the two die plates under pressure for a certain duration of time (e.g., 8 seconds approximately). A clamping pressure of about 80 pounds per square inch has been found to be adequate.

The application of the heat and pressure to the plastic sheet 22 forms the dome-shaped actuating elements 24–36 therein.

The chamber 160 is coupled to the vacuum source 162 to draw the plastic sheet 22 securely against the cooled die plate 104 (at about 65° F.).

The press 102 is opened up with the thermoformed plastic sheet 22 held firmly against the cooled die plate 104.

The thermoformed plastic sheet 22 is maintained against the cooled die plate 104 for a preset length of time (e.g., 2 seconds approximately) to allow the plastic sheet to take a permanent set.

The vacuum source 162 is turned off and the pressurized air source 164 is turned on to eject the thermoformed plastic sheet 22 from the upper die plate 104. The cycle is then repeated.

Figure 6:
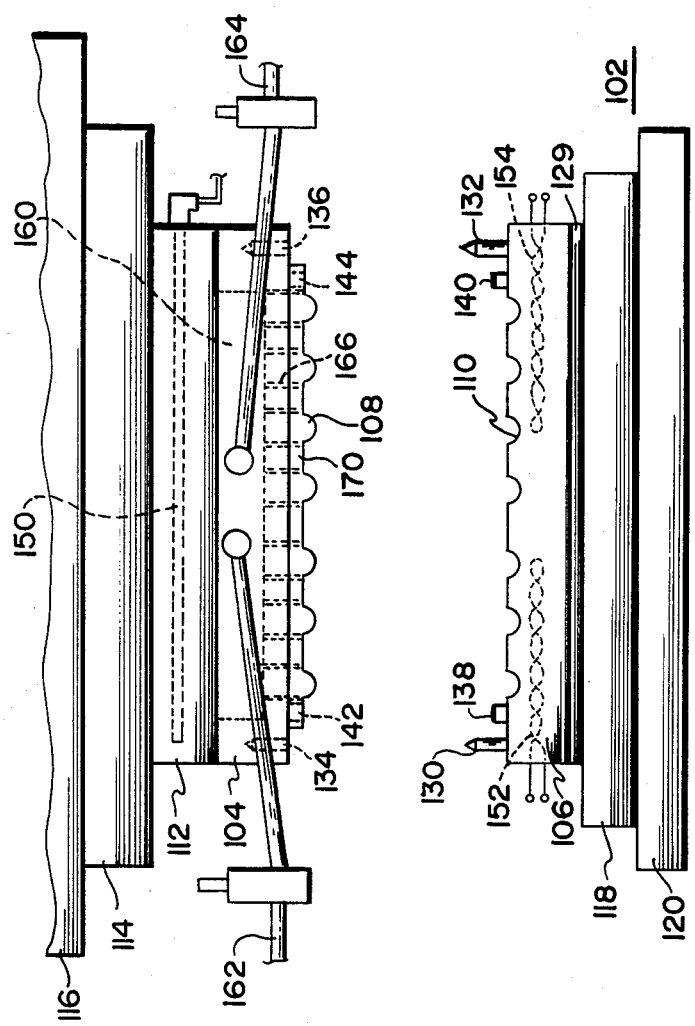
FIG. 6 is an enlarged view of the essential aspects of a modified version of the subject thermoforming apparatus.

FIG. 6 shows a modified version of the thermoforming apparatus 100. In the FIG. 6 embodiment, the projections 108 are formed in a silicone rubber tool 170 which is glued to the upper die plate 104. The silicone rubber tool 170 is molded in situ on the press 102 itself with the help of a template (not shown). The channels 166 in the silicone rubber tool 170 are also molded in place with the use of removable pins (not shown). The advantage of the silicone rubber tool 170 over an aluminum tool is that it is less expensive. On the other hand, the life of the silicone rubber tool 170 is relatively short.

The preformed plastic sheet 22 is then assembled together with other pieces, as indicated in FIG. 2, to form the membrane switch 20. The shorting bars 72–84 are desirably printed on the top plastic sheet 22 prior to the thermoforming operation.

While the applicant has described specific embodiments of his invention, it will be seen that numerous modifications can be made in the subject thermoforming apparatus 100 without departing from the principles of the present invention. For example, the thermoforming apparatus 100 may be provided with a programmer for automatically sequencing the operations thereof. The plastic sheet 22 can be made from, for example, polystyrene, instead of polyester.

What is claimed is:

1. An apparatus for thermoforming a plurality of depressible protrusions in a substantially thin and flat plastic sheet; said thermoforming apparatus comprising:
   (A) a pair of male and female die plates, respectively, having a plurality of matching projections and cavities;
   (B) a selectively-operated means for closing and opening said die plates;
   (C) means for heating one of said die plates to a desired temperature;
   (D) means for cooling the other of said die plates to a preset temperature; and
   (E) a selectively-actuated holding means for securing a heated, thermoformed plastic sheet to said cooled die plate;

wherein a plastic sheet is clamped under pressure between said die plates for a certain length of time to cause thermoforming of said protrusions in said plastic sheet, and said die plates are separated with said plastic sheet held against said cooled die plate to allow said plastic sheet to cool off.

2. The thermoforming apparatus as defined in claim 1 wherein said female die plate is heated and said male die plate is cooled.

3. The thermoforming apparatus as defined in claim 2 further including a pair of top and bottom shoes; wherein said male and female die plates are respectively secured to said top and bottom die shoes.

4. The thermoforming apparatus as defined in claim 1 wherein said heating means comprises a cartridge heater mounted to said heated die plate.

5. The thermoforming apparatus as defined in claim 1 wherein said cooling means comprises means for circulating chilled water through said cooled die plate.

6. The thermoforming apparatus as defined in claim 5 wherein said chilled water is at approximately 55° F.

7. The thermoforming apparatus as defined in claim 1 wherein said selectively-actuated holding means uses vacuum to secure a thermoformed plastic sheet to said cooled die plate.

8. The thermoforming apparatus as defined in claim 1 further including a selectively-actuated separating means for ejecting a thermoformed plastic sheet held against said cooled die plate.

9. The thermoforming apparatus as defined in claim 8 wherein said selectively-actuated separating means uses pressurized air to release a thermoformed plastic sheet from said cooled die plate.

10. The thermoforming apparatus as defined in claim 1 wherein said desired temperature of said heated die plate is about 212° F.

11. The thermoforming apparatus as defined in claim 1 wherein said preset temperature of said cooled die plate is about 65° F.

12. The thermoforming apparatus as defined in claim 1 wherein one of said die plates is provided with a set of leader pins, and the other of said die plates is fitted with registered guide holes to assure alignment of said projections and cavities in said respective die plates.

13. The thermoforming apparatus as defined in claim 1 for thermoforming a plastic sheet provided with a pair of locating holes; wherein one of said die plates is equipped with a set of pilot pins which are received in said locating holes in said plastic sheet to assure accurate registration of said plastic sheet with respect to said die plates.

14. The thermoforming apparatus as defined in claim 1 wherein said die plates are made from aluminum stock.

15. The thermoforming apparatus as defined in claim 14 wherein the portion of said male die plate having said projections is made out of silicone rubber.

* * * * *